US009825270B2

(12) United States Patent
Moon et al.

(10) Patent No.: US 9,825,270 B2
(45) Date of Patent: Nov. 21, 2017

(54) SEPARATOR FOR LITHIUM BATTERY, LITHIUM BATTERY INCLUDING THE SAME, AND METHOD OF MANUFACTURING THE LITHIUM BATTERY

(71) Applicant: SAMSUNG SDI CO., LTD., Yongin-si, Gyeonggi-do (KR)

(72) Inventors: Jung-Jin Moon, Suwon-si (KR); Chan-Jung Kim, Suwon-si (KR); Ihn Kim, Suwon-si (KR); Yun-Kyung Jo, Suwon-si (KR); Young-Su Kim, Suwon-si (KR); Na-Rae Park, Suwon-si (KR); Suk-Jung Son, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 255 days.

(21) Appl. No.: 14/489,973

(22) Filed: Sep. 18, 2014

(65) Prior Publication Data

US 2015/0140403 A1 May 21, 2015

(30) Foreign Application Priority Data

Nov. 19, 2013 (KR) .......... 10-2013-0140889

(51) Int. Cl.
| | |
|---|---|
| *H01M 2/16* | (2006.01) |
| *H01M 10/052* | (2010.01) |
| *H01M 10/0587* | (2010.01) |
| *H01M 10/0585* | (2010.01) |
| *H01M 10/058* | (2010.01) |
| *H01M 2/14* | (2006.01) |
| *H01M 10/0525* | (2010.01) |

(52) U.S. Cl.
CPC ......... *H01M 2/1686* (2013.01); *H01M 2/162* (2013.01); *H01M 2/166* (2013.01); *H01M 2/168* (2013.01); *H01M 10/052* (2013.01); *H01M 10/058* (2013.01); *H01M 10/0585* (2013.01); *H01M 10/0587* (2013.01); *H01M 2/145* (2013.01); *H01M 10/0525* (2013.01); *Y10T 29/49108* (2015.01)

(58) Field of Classification Search
CPC .... H01M 2/16; H01M 2/166; H01M 2/16686; H01M 10/052; H01M 10/0525; H01M 10/058; H01M 10/0587; H01M 10/0585
See application file for complete search history.

(56) References Cited

U.S. PATENT DOCUMENTS

2010/0323230 A1* 12/2010 Lee ................. H01M 2/166
429/143

FOREIGN PATENT DOCUMENTS

| JP | 2000-3065690 A | 11/2012 |
| KR | 10-1020325 B1 | 3/2011 |
| WO | WO 03/012896 A1 | 2/2003 |

OTHER PUBLICATIONS

Search Report dated Feb. 10, 2015 in corresponding European Patent Application No. 14193622.9.

* cited by examiner

*Primary Examiner* — Karie O'Neill Apicella
(74) *Attorney, Agent, or Firm* — Lee & Morse, P.C.

(57) ABSTRACT

A separator for a lithium battery includes a porous coating layer disposed on a surface of a porous base, and a first adhesive layer including a plurality of dots disposed at intervals at a surface of the porous coating layer, the plurality of dots of the first adhesive layer penetrating through the porous coating layer to be on the surface of the porous base.

15 Claims, 6 Drawing Sheets

SEPARATOR FOR LITHIUM BATTERY, LITHIUM BATTERY INCLUDING THE SAME, AND METHOD OF MANUFACTURING THE LITHIUM BATTERY

CROSS-REFERENCE TO RELATED APPLICATION

Korean Patent Application No. 10-2013-0140889, filed on Nov. 19, 2013, in the Korean Intellectual Property Office, and entitled: "SEPARATOR FOR LITHIUM BATTERY, LITHIUM BATTERY INCLUDING THE SAME, AND METHOD OF MANUFACTURING THE LITHIUM BATTERY," is incorporated by reference herein in its entirety.

BACKGROUND

1. Field

Embodiments relate to a separator for a lithium battery, a lithium battery including the separator, and a method of manufacturing the lithium battery.

2. Description of the Related Art

Demand has increased for secondary batteries for use in portable electronic devices for information communications, such as personal data assistants (PDAs), mobile phones, and laptop computers, or electric bicycles, electric vehicles, and the like. With a trend toward smaller and light-weight electronic devices, small, light-weight lithium batteries with high charging and discharging capacities have become available for practical use.

SUMMARY

Embodiments are directed to a separator for a lithium battery, including a porous coating layer disposed on a surface of a porous base, and a first adhesive layer including a plurality of dots disposed at intervals at a surface of the porous coating layer, the plurality of dots of the first adhesive layer penetrating through the porous coating layer to be on the surface of the porous base.

The plurality of dots of the first adhesive layer may have an average diameter of about 10 μm or greater.

The plurality of dots of the first adhesive layer may have an average diameter of about 100 μm to about 500 μm.

The intervals of the plurality of dots of the first adhesive layer may be regular.

The intervals of the plurality of dots of the first adhesive layer may be regular in a range of about 0.1 mm to about 10 mm.

The first adhesive layer may include a dot having a thickness of about 0.5 um to about 2 um.

The first adhesive layer may include dots of a polymer structure of one or more of polyethylene, polypropylene, an ethylene propylene copolymer, polyvinylchloride, polyvinylidene chloride, polyvinylidene fluoride, polystyrene, polyacrylonitrile, polytetrafluoroethylene (PTFE), polymethacrylate, polymethylmethacrylate, polyvinylacetate, polyisoprene, polychloroprene, polyester, polycarbonate, polyamide, polyacrylate, polyurethane, polyethylene oxide, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, phenol resin, epoxy resin, polyvinylpyrolidone, polyepichlorohydrin, polyphosphagen, ethylene propylene diene copolymer, polyvinylpyridine, sulfonated chloropolyethylene, polysulfone, polyvinylalcohol, polyvinylacetate, thermoplastic polyester rubber (PTEE), carboxymethylcellulose, hydroxypropylmethylcellulose, hydroxypropylcellulose, or diacetylcellulose.

The first adhesive layer may be disposed opposite to an anode.

The separator may further include a second adhesive layer including a plurality of dots disposed at intervals at a surface of the porous base opposite to the porous coating layer.

The porous coating layer may include inorganic particles and polymer particles.

The inorganic particles may include one or more of α-alumina (α-$Al_2O_3$), γ-alumina (γ-$Al_2O_3$), boehmite (γ-AlO(OH)), gibbsite (γ-$Al(OH)_3$), colloidal silica, zirconium oxide, magnesium fluoride, $BaTiO_3$, $Pb(Zr, Ti)O_3$ (PZT), $Pb_{1-x}LaZr_{1-y}Ti_yO_3$ (PLZT), $PB(Mg_3Nb_{2/3})O_3$—$PbTiO_3$ (PMN-PT), $HfO_2$, $SrTiO_3$, $TiO_2$, SiC, $SnO_2$, or $CeO_2$.

The polymer particles may include one or more of acrylic acid ester-based polymer particles or styrene-butadiene rubber particles.

The polymer particles may be included in the porous coating layer in an amount of about 0.1 part to about 10 parts by weight, based on 100 parts by weight of the inorganic particles.

Embodiments are also directed to a lithium battery, including a cathode, an anode, and a separator according to an embodiment.

Embodiments are also directed to a method of manufacturing a lithium battery, the method including disposing a separator according to an embodiment between a cathode and an anode to form at least one electrode assembly, stacking the at least one electrode assembly upon one another or rolling up the at least one electrode assembly, and heat-pressing a resulting stack or roll of the at least one electrode assembly at about 70° C. to about 120° C. to form an integrated electrode assembly, and injecting an electrolyte into the integrated electrode assembly.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

As used herein, the expression "disposed on a (the) surface" may refer to both "disposed to directly contact the surface" to and "disposed above the surface".

Figure 1:
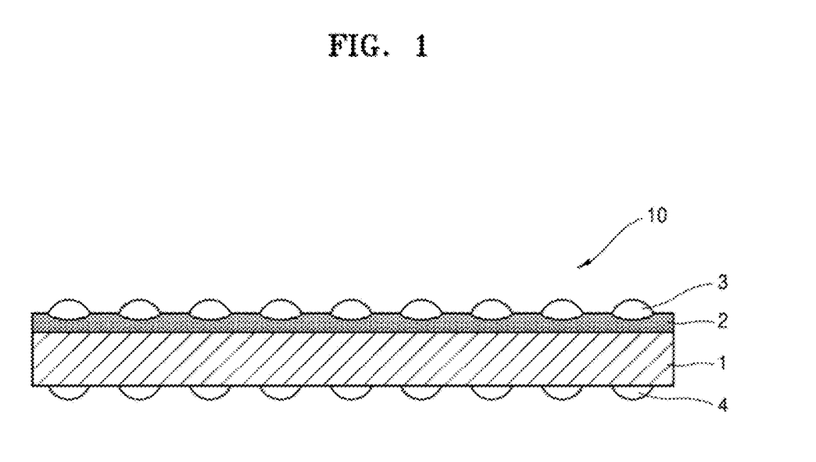
FIG. 1 illustrates a schematic view of a separator for a lithium battery, according to an example embodiment.

FIG. 1 is a schematic view of a separator 10 for a lithium battery, according to an example embodiment.

Referring to FIG. 1, the separator 10 may include a porous coating layer 2 on a surface of a porous base 1, and a first adhesive layer 3 including a plurality of dots disposed at intervals at a surface of the porous coating layer 2. The plurality of dots of the first adhesive layer 3 may penetrate through the porous coating layer 2 to be on the surface of the porous base 1. In an implementation, the plurality of dots of the first adhesive layer 3 may contact the porous base 1.

According to the present example embodiment, the plurality of dots of the first adhesive layer 3 penetrates through the porous coating layer 2 to be on the surface of the porous base 1. A general separator for a lithium battery that includes a porous coating layer on a surface of a porous base may have weak adhesion to an electrode, and may easily be separated from an electrode during manufacturing a battery cell. The separator 10 according to the present example embodiment has a structure in which the plurality of dots of the first adhesive layer 3 may penetrate through the porous coating layer 2 to be on a surface of the porous base 1, which may prevent separation of the porous coating layer 2 from the porous base 1, deformation, etc., during assembly of a cell. Accordingly, the separator 10 may have improved adhesion to an electrode. Therefore, a lithium battery including the separator 10 may have improved lifetime characteristics.

The plurality of dots of the first adhesive layer 3 may include dots having an average diameter of about 10 μm or greater. For example, the first adhesive layer may include dots having an average diameter of about 10 μm to about 500 μm, and in some embodiments, an average diameter of about 100 μm to about 500 μm, and in some other embodiments, an average diameter of about 200 μm to about 500 μm. When the first adhesive layer 3 includes a dot having an average diameter of about 10 μm or greater, it may be easier to form a structure that ensures penetration of the dots through the porous coating layer 2, and the adhesion between the separator 10 and an electrode may be enhanced.

The intervals of the plurality of dots of the first adhesive layer may be regular. For example, the intervals of the plurality of dots of the first adhesive layer may be regular in a range of about 0.1 mm to about 10 mm. When the intervals of the plurality of dots are regular, the adhesion between the porous coating layer and the first adhesive layer may be further improved. The dots may have any of a variety of shapes. For example, the dots may have a shape of a circle, a triangle, a square, a rectangular, a rhombus, an ellipse, or a fan. In some embodiments, the plurality of dots of the first adhesive layer may be interconnected to one another to form a single dot. The first adhesive layer may have a thickness of about 0.5 um to about 2 um.

The first adhesive layer 3 may include dots having a polymer structure formed of, e.g., one or more of polyethylene, polypropylene, an ethylene propylene copolymer, polyvinylchloride, polyvinylidene chloride, polyvinylidene fluoride, polystyrene, polyacrylonitrile, polytetrafluoroethylene (PTFE), polymethacrylate, polymethylmethacrylate, polyvinylacetate, polyisoprene, polychloroprene, polyester, polycarbonate, polyamide, polyacrylate, polyurethane, polyethylene oxide, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, phenol resin, epoxy resin, polyvinylpyrolidone, polyepichlorohydrin, polyphosphagen, ethylene propylene diene copolymer, polyvinylpyridine, sulfonated chloropolyethylene, polysulfone, polyvinylalcohol, polyvinylacetate, thermoplastic polyester rubber (PTEE), carboxymethylcellulose, hydroxypropylmethylcellulose, hydroxypropylcellulose, or diacetylcellulose.

Examples of a polymerizable monomer used to form the dot having such a polymer structure may include ethylenically unsaturated carboxylic acid alkyl esters, such as methyl (meth)acrylate, butyl (meth)acrylate, ethyl (meth) acrylate, ethyl hexyl (meth)acrylate; cyano group-containing ethylenically unsaturated monomers, such as acrylonitrile, methacrylonitrile, fumaronitrile, α-chloroacrylonitrile, and α-cyanoethylacrylonitrile; conjugated diene monomers, such as 1,3-butadiene, isoprene, 2,3-dimethyl-1,3-butadiene, 2-ethyl-1,3-butadiene, 1,3-pentadiene, and chloroprene; ethylenically unsaturated carboxylic acids, such as acrylic acid, methacrylic acid, maleic acid, fumaric acid, and citaconic acid, and salts thereof; aromatic vinyl monomers, such as styrene, alkyl styrene, and vinyl naphthalene; fluoroalkyl vinyl ethers, such as fluoroethyl vinyl ether; vinylpyridine; non-conjugated monomers, such as vinylnorbornene, dicyclopentadiene, and 1,4-hexadiene; α-olefins, such as ethylene and propylene; ethylenically unsaturated amide monomers, such as (meth)acryl amide; and sulfonic acid-based unsaturated monomers, such as acryl amide methyl propane sulfonic acid, and styrene sulfonic acid.

For example, the first adhesive layer 3 may include dots having a polymer structure of one or more of polyethylene, polypropylene, an ethylene propylene copolymer, polyvinylchloride, polyvinylidene chloride, polyvinylidene fluoride, polymethacrylate, polymethylmethacrylate, a styrene-acrylonitrile copolymer, an acrylonitrile-styrene-acrylate copolymer, a styrene-butadiene copolymer, acrylated styrene-butadiene copolymer, an acrylonitrile-butadiene copolymer, an acrylonitrile-butadiene-styrene copolymer, acryl rubber, butyl rubber, or fluorine rubber.

The first adhesive layer 3 may include dot having an aqueous polymer structure or a nonaqueous polymer structure. The aqueous polymer structure may refer to a polymer structure that may be easily dispersed or dissolved in water, and for example, may be in particle form.

The first adhesive layer 3 may be disposed opposite to an anode when the separator 10 is used in a lithium battery. When a polymer structure in the first adhesive layer 3 is partially, for example, a styrene-butadiene copolymer, the first adhesive layer of the styrene-butadiene copolymer may be less resistant against oxidation caused by a cathode potential, so that oxidation of the styrene-butadiene copolymer at a contact surface between the first adhesive layer 3 and the cathode may be facilitated. For this reason, the first adhesive layer 3 may be disposed opposite to the anode when the separator 10 is used in a lithium battery, rather than opposite to the cathode.

Referring again to FIG. 1, the separator 10 may include a second adhesive layer 4 including a plurality of dots disposed at an interval on a surface of the porous base 1 opposite to the porous coating layer 2. An average diameter, a thickness, and a material of the plurality of dots in the second adhesive layer 4, and an interval therebetween may be the same as those of the first adhesive layer 3 described above.

A total area of the first adhesive layer 3 and the second adhesive layer 4 may be from about 10% to about 70% based on a total area of the separator 10. The total area may be a sum of the areas of each of the dots. The total area of the first adhesive layer 3 and the second adhesive layer 4 may be from about 20% to about 70% based on the total area of the separator 10. When the total area of the first adhesive layer 3 and the second adhesive layer 4 with respect to the total area of the separator 10 are within these ranges, the separator 10 may be more easily impregnated with an electrolyte, and may have improved adhesion to an electrode.

The porous coating layer 2 may include inorganic particles and polymer particles.

The inorganic particles may include one or more of, e.g., α-alumina (α-$Al_2O_3$), γ-alumina (γ-$Al_2O_3$), boehmite (γ-AlO(OH)), gibbsite (γ-Al(OH)$_3$), colloidal silica, zirconium oxide, magnesium fluoride, $BaTiO_3$, Pb(Zr, Ti)$O_3$ (PZT), $Pb_{1-x}LaZr_{1-y}Ti_yO_3$ (PLZT), PB($Mg_3Nb_{2/3}$)$O_3$—Pb-$TiO_3$ (PMN-PT), $HfO_2$, $SrTiO_3$, $TiO_2$, SiC, $SnO_2$, or $CeO_2$. The inorganic particle may further include a lithium ion-conducting ceramic. The lithium ion-conducting ceramic may be, for example, lithium phosphate ($Li_3PO_4$), lithium titanium phosphate ($Li_xTi_y(PO_4)_3$, where $0<x<2$, and $0<y<3$), lithium aluminum titanium phosphate ($Li_xAl_yTi_z(PO_4)_3$, where $0<x<2$, $0<y<1$, and $0<z<3$), lithium aluminum titanium phosphate doped with zirconium (Zr), hafnium (Hf), or rutherfordium (Rf) ($Li_{1+x}Al_xTi_{2-x}M_\alpha(PO_{4+\beta})_3$, where $0<x<0.5$, $0\leq\alpha\leq0.1$, $0\leq\beta\leq0.1$, and M is Zr, Hf, or Rf), lithium aluminum titanium phosphate doped with silicon ($Li_{1+x+y}Al_xTi_{2-x}Si_yP_{3-y}O_{12}$, where $0\leq x\leq 1$ and $0\leq y\leq 1$), or a mixture thereof. The inorganic particles may have an average diameter of, for example, about 1 nm to about 100 nm.

The polymer particles may include one or more of acrylic acid ester-based polymer particles, styrene-butadiene rubber particles, etc. The polymer particles may be general polymer particles. The polymer particle may have an average diameter of about 10 nm to about 150 nm, and in some embodiments, an average diameter of about 10 nm to about 120 nm.

An amount of the polymer particles in the porous coating layer 2 may be from about 0.1 part to about 10 parts by weight, based on 100 parts by weight of the inorganic particles. For example, the amount of the polymer particles in the porous coating layer 2 may be from about 0.1 part to about 5 parts by weight based on 100 parts by weight of the inorganic particles. When the amount of the polymer particles in the porous coating layer 2 based on the inorganic particles is within these ranges, the inorganic particles in the porous coating layer 2 may retain pores of appropriate sizes therebetween to have appropriate adhesion therebetween while enabling transfer of lithium ions.

The porous base 1 may be a polyolefin-based porous base. The porous base 1 may be a membrane base or a fibrous base formed from, for example, polyethylene or polypropylene alone, or a mixture thereof.

The porous base 1 may have a mixed multi-layer structure, for example, a two-layered structure including polyethylene and polypropylene layers, a three-layered structure including polyethylene, polypropylene and polyethylene layers, or a three-layered structure including polypropylene, polyethylene, and polypropylene layers.

The separator 10 may have a thickness of about 7 μm to about 25 μm, and in some embodiments, a thickness of about 9 μm to about 22 μm. When the thickness of the separator 10 is within these ranges, the separator 10 may separate the anode and the cathode from each other to prevent a short circuit, and may improve lifetime characteristics of a lithium battery including the separator 10.

A method of manufacturing a separator, according to an example embodiment, is as follows.

First, a porous base may be prepared. A membrane base or a fibrous base formed from, for example, polyethylene or polypropylene alone, or a mixture thereof may be used as the porous base.

Next, a porous coating layer may be formed on a surface of the porous base. For example, the porous coating layer may be formed by mixing inorganic particles with water and uniformly dispersing the mixture to obtain an aqueous dispersion, adding polymer particles, for example, acrylic acid ester-based polymer particles, to the aqueous dispersion and uniformly homogenizing to obtain a dispersion. This dispersion may be coated and dried on a surface of the porous base.

The acrylic acid ester-based polymer may be prepared by polymerization of an ethylenically unsaturated carboxylic acid ester and a monomer copolymerizable with the ethylenically unsaturated carboxylic acid ester. Herein, the polymerization is construed as including cross-linking reaction.

Examples of the ethylenically unsaturated carboxylic acid ester are acrylic acid alkyl esters, such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, isobornyl acrylate, hydroxypropyl acrylate, lauryl acrylate, and substituted alkyl esters thereof; methacrylic acid alkyl esters, such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethyl hexyl methacrylate, hydroxy propyl methacrylate, and lauryl methacrylate, and substituted alkyl esters thereof; crotonic acid alkyl esters, such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate, and hydroxypropyl crotonate, and substituted alkyl esters thereof; amino group-containing methacrylic acid esters, such as dimethylamino ethyl methacrylate, and diethylamino ethyl methacrylate; alkoxy group-containing methacrylic acid esters, such as methoxy polyethylene glycol mono methacrylic acid ester; and unsaturated dicarboxylic acid monoesters, such as monooctyl maleate, monobutyl maleate, monooctyl itaconate, etc. General ethylenically unsaturated carboxylic acid esters may be used.

Examples of the monomer copolymerizable with the ethylenically unsaturated carboxylic acid ester are unsaturated carboxylic acids, such as acrylic acid, methacrylic acid, itaconic acid, and fumaric acid; carboxylic acid esters having at least two carbon-carbon double bonds, such as diethylene glycol dimethacrylate, diethylene glycol dimethacrylate, and trimethylol propane triacrylate; styrene-based monomers, such as styrene, chlorostyrene, vinyltoluene, t-butyl styrene, vinyl benzoic acid, methyl vinyl benzoic acid, vinyl naphthalene, chloromethyl styrene, hydroxy methyl styrene, α-methyl styrene, and divinyl benzene; amide-based monomers, such as acryl amide, N-methylol acryl amide, acryl amide-2-methyl propane sulfonic acid; α,β-unsaturated nitrile compounds, such as acrylonitrile, and methacrylonitrile; olefins, such as ethylene and propylene; diene-based monomers, such as butadiene and isoprene; halogen atom-containing monomers, such as vinyl chloride, and vinylidene chloride; vinyl esters, such as vinyl acetate, vinyl propionate, vinyl butyrate, and vinyl benzoate; vinyl ethers, such as allyl glycidyl ether, methyl vinyl ether, ethyl vinyl ether, butyl vinyl ether; vinyl ketones, such as methyl vinyl ketone, ethyl vinyl ketone, butyl vinyl ketone, hexyl vinyl ketone, and isoprophenyl vinyl ketone; and heterocyclic vinyl compounds, such as N-vinyl pyrrolidone, vinylpyridine, and vinylimidazole. General monomers that are copolymerizable with ethylenically unsaturated carboxylic acid esters may be used.

For example, the monomer copolymerizable with the ethylenically unsaturated carboxylic acid ester may include one or more of carboxylic acid esters having at least two carbon-carbon double bonds, amide-based monomers, α,β-unsaturated nitrile compounds, and vinyl ethers.

A mixed ratio of the ethylenically unsaturated carboxylic acid ester and the monomer copolymerizable with the ethylenically unsaturated carboxylic acid ester may be from about 0.1:99.9 to about 99.9:0.1 by mole.

The acrylic acid ester-based polymer may be, for example, an aqueous emulsion. The aqueous emulsion may refer to a dispersion and/or a solution of polymer particles dispersed and/or dissolved in water. The acrylic acid ester-based polymer may have a weight average molecular weight of about 1,000,000 to about 1,500,000.

The acrylic acid ester-based polymer for forming the porous coating layer may be used in the form of aqueous emulsion as it is or may be used along with a solvent added thereto. The solvent may be, for example, water, acetone, tetrahydrofuran, methylene chloride, chloroform, dimethylformamide, N-methyl-2-pyrrolidone, cyclohexane, or a mixture thereof. The acrylic acid ester-based polymer may be prepared by a variety of methods, e.g., emulsification polymerization or solution polymerization. A solid content of the acrylic acid ester-based polymer may be from about 1 wt % to about 25 wt % based on a total weight of the acrylic acid ester-based polymer emulsion or the acrylic acid ester-based polymer solution.

The coating method of forming the porous coating layer may be performed by a variety of methods, e.g., spray coating, dip coating, die coating, roll coating, micro gravure coating, etc.

Next, a first adhesive layer including a plurality of dots may be formed on a surface of the porous coating layer or on a surface of the porous base opposite to the porous coating layer by using a micro gravure method, in which the plurality of dots having an average diameter of about 10 μm or greater and a thickness of about 0.5 μm to about 2 μm may be disposed at intervals on the surface of the porous coating layer and then left at room temperature for about 0.5 hour to about 4 hours to form the first adhesive layer. In some embodiments, a second adhesive layer including a plurality of dots having an average diameter of about 10 μm or greater and a thickness of about 0.5 μm to about 2 um may formed on a surface of the porous base opposite to the porous coating layer in the same manner as used in forming the first adhesive layer. Subsequently, the porous base with the first adhesive layer and/or the second adhesive layer may be dried at about 50° C. to about 60° C. in a vacuum for about 4 hours to about 10 hours to penetrate the plurality of dots of the first adhesive layer through the porous coating layer to be on the surface of the porous base, i.e., to be between the porous coating layer and the surface of the porous base underlying the porous coating layer, to form the separator.

For example, a coating solution for the micro gravure method may be prepared by stirring and dispersing a mixture of a styrene-butadiene copolymer having a weight average molecular weight of about 1,000,000 to about 1,500,000 and a solvent in an appropriate ratio at room temperature. The solvent of the coating solution may be water, acetone, tetrahydrofuran, methylene chloride, chloroform, dimethylformamide, N-methyl-2-pyrrolidone, cyclohexane, or a mixture thereof. A solid content of the styrene-butadiene copolymer of the coating solution may be, for example, in a range of about 1 wt % to about 25 wt % based on the total weight of the styrene-butadiene copolymer solution.

According to another example embodiment, a lithium battery includes a cathode, an anode, and a separator according to an embodiment disposed between the cathode and the anode.

Figure 2:
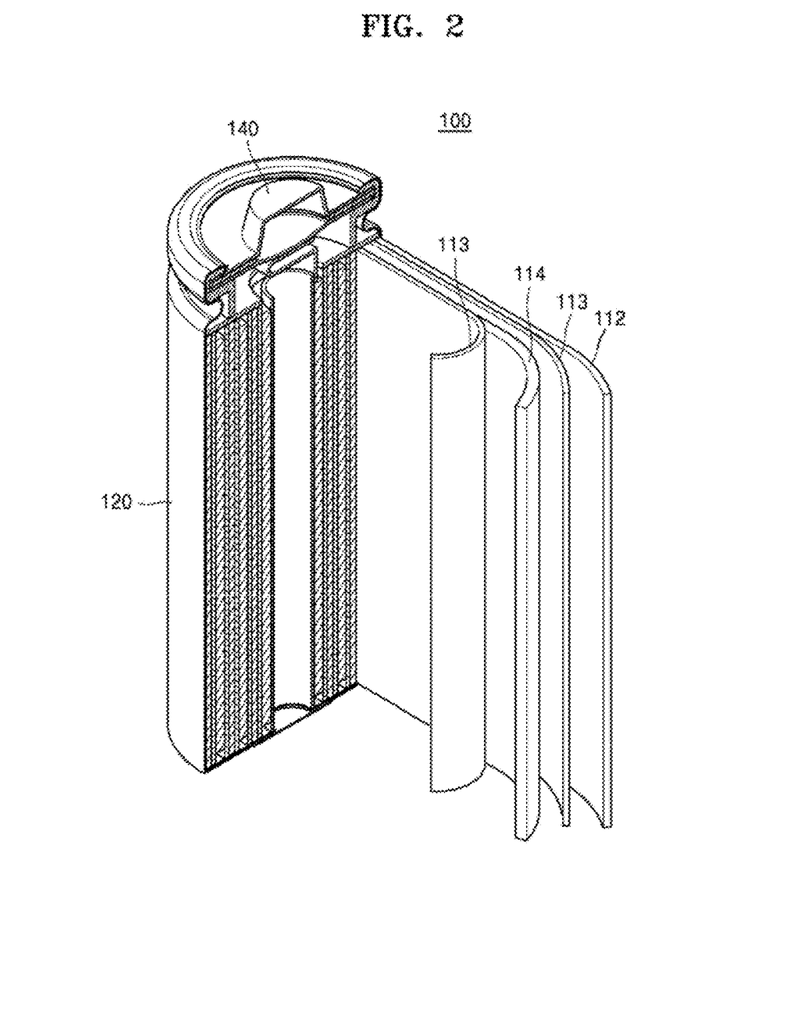
FIG. 2 is an exploded perspective view illustrating a structure of a lithium battery according to an example embodiment.

FIG. 2 is an exploded perspective view of a structure of a lithium battery 100 according to an example embodiment.

Although the lithium secondary battery 100 of FIG. 2 is cylindrical, lithium secondary batteries according to embodiments may be of other shapes, e.g., a rectangular type, a pouch type, etc.

Lithium secondary batteries may be classified as either lithium ion batteries, lithium ion polymer batteries, or lithium polymer batteries, according to the type of separator and/or electrolyte included therein. In addition, lithium batteries may be classified as a cylindrical type, rectangular type, coin type, or pouch type, according to the shape thereof. Lithium batteries may also be classified as either bulk type or thin film type, according to the size thereof. Lithium secondary batteries according to embodiments may have various shapes.

In the example embodiment shown in FIG. 3, the lithium secondary battery 100 in cylindrical form includes an anode 112, a cathode 114, a separator 113 disposed between the anode 112 and the cathode 114, and an electrolyte (not shown) impregnated into the anode 112, the cathode 114, and the separator 113, a battery case 120, and a sealing member 140 sealing the battery case 120. The lithium secondary battery 100 may be manufactured by sequentially stacking the anode 112, the separator 113, and the cathode 114 upon one another to form a stack, rolling the stack in a spiral form, and accommodating the rolled up stack in the battery case 120. The separator 113 may be the same as the separator 10 according to example embodiments as described above.

The anode 112 includes a current collector and an anode active material layer disposed on the current collector.

The current collector for the anode 112 may be a Cu current collector, etc. Examples of the current collector are stainless steel, aluminum, nickel, titanium, thermally-treated carbon, copper or stainless steel that is surface-treated with carbon, nickel, titanium, or silver, and aluminum-cadmium alloys. In addition, the anode current collector may be processed to have fine irregularities on surfaces thereof so as to enhance adhesive strength of the current collector to the anode active material layer, and may be used in various forms including films, sheets, foils, nets, porous structures, foams, and non-woven fabrics.

An anode active material for forming the anode active material layer may be a general anode active material.

Examples of the anode active material are lithium metal, a metal that is alloyable with lithium, a transition metal oxide, a material that allows doping or undoping of lithium, a material that allows reversible intercalation and deintercalation of lithium ions, and the like.

Examples of the transition metal oxide are a tungsten oxide, a molybdenum oxide, a titanium oxide, a lithium titanium oxide, a vanadium oxide, and a lithium vanadium oxide.

Examples of the material that allows doping or undoping of lithium are silicon (Si), $SiO_x$ wherein $0<x<2$, an Si—Y alloy wherein Y is an alkali metal, an alkali earth metal, a Group 13 to Group 16 element, a transition metal, a rare earth element, or combinations thereof (except for Si), Sn, $SnO_2$, an Sn—Y alloy wherein Y is an alkali metal, an alkali earth metal, a Group 13 to Group 16 element, a transition metal, a rare earth element, or a combination thereof (except for Sn), and combinations of at least one of these materials and $SiO_2$. Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may be a suitable carbonaceous anode active material for a lithium battery. Examples of such carbonaceous materials are crystalline carbon, amorphous carbon, or mixtures thereof. Examples of the crystalline carbon are natural graphite and artificial graphite that are in amorphous, plate, flake, spherical, or fibrous form. Examples of the amorphous carbon are soft carbon (carbon sintered at low temperatures), hard carbon, meso-phase pitch carbides, and sintered corks.

The anode active material layer may also include a binder and a conducting agent.

The binder may strongly bind anode active material particles together and to a current collector. Examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used for providing conductivity to the anode. An electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used alone or in a combination of at least two thereof.

Amounts of the anode active material, the binder, and the conducting agent may be determined according to the type of lithium battery, e.g., a weight ratio of the anode active material to a mixture of the conducting agent and the binder may be from about 98:2 to about 92:8. A mixing ratio of the conducting agent to the binder may be from about 1:1.0 to about 1:3, etc.

The cathode 114 may include a current collector and a cathode active material layer disposed on the current collector.

An Al current collector, etc., may be used as the cathode current collector. In addition, similar to the anode current collector, the cathode current collector may also be processed to have fine irregularities on surfaces thereof so as to enhance the adhesive strength of the cathode current collector to the cathode active material layer, and may be used in various forms, including a film, a sheet, a foil, a net, a porous structure, foam, and non-woven fabric.

The cathode active material may be a general cathode active material. For example, a compound that allows reversible intercalation and deintercalation of lithium may be used. The cathode active material may be at least one composite oxide of lithium with a metal selected from Co, Mn, Ni, and a combination thereof, for example, a compound represented by one of $Li_aA_{1-b}B1_bD_2$ (where $0.90 \le a \le 1.8$, and $0 \le b \le 0.5$); $Li_aE_{1-b}B1_bO_{2-c}D_c$ (where $0.90 \le a \le 1.8$, $0 \le b \le 0.5$, and $0 \le c \le 0.05$); $LiE_{2-b}B1_bO_{4-c}D_c$ (where $0 \le b \le 0.5$, and $0 \le c \le 0.05$); $Li_aNi_{1-b-c}Co_bB1_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bB1_cO_{2-\alpha}F1_\alpha$ (where $0.90 \le a \le 1.8$, $0 \le b \le 0.5$, $0 \le c \le 0.05$, and $0 < \alpha < 2$); $Li_aNi_{1-b-c}Co_bB1_cO_{2-\alpha}F1_2$ (where $0.90 \le a \le 1.8$, $0 \le b \le 0.5$, $0 \le c \le 0.05$, and $0 < \alpha < 2$); $Li_aNi_{1-b-c}Mn_bB1_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bB1_cO_{2-\alpha}F1_\alpha$ (where $0.90 \le a \le 1.8$, $0 \le b \le 0.5$, $0 \le c \le 0.05$, and $0 < \alpha < 2$); $Li_aNi_{1-b-c}Mn_bB1_cO_{2-\alpha}F1_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dG_eO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $LiQO_2$; $LiQS_2$; $LiV_2O_5$; $LiZO_2$; $LiNiVO_4$; $Li_{(3-f)}J_2(PO_4)_3$ (where $0 \le f \le 2$); and $Li_{(3-f)}Fe_2(PO_4)_3$ (where $0 \le f \le 2$); $LiFePO_4$.

Examples of the cathode active material are $LiMn_2O_4$, $LiNi_2O_4$, $LiCoO_2$, $LiNiO_2$, $LiMnO_2$, $Li_2MnO_3$, $LiFePO_4$, and $LiNi_xCo_yO_2$ ($0 \le x \le 0.15$ and $0 \le y \le 0.85$).

In the formulae above, A is selected from the group of nickel (Ni), cobalt (Co), manganese (Mn), and combinations thereof; B1 is selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group of oxygen (O), fluorine (F), sulfur (S), phosphorus (P), and combinations thereof; E is selected from the group of cobalt (Co), manganese (Mn), and combinations thereof; F1 is selected from the group of fluorine (F), sulfur (S), phosphorus (P), and combinations thereof; G is selected from the group of aluminum (Al), chromium (Cr), manganese (Mn), iron (Fe), magnesium (Mg), lanthanum (La), cerium (Ce), strontium (Sr), vanadium (V), and combinations thereof; Q is selected from the group of titanium (Ti), molybdenum (Mo), manganese (Mn), and combinations thereof; Z is selected from the group of chromium (Cr), vanadium (V), iron (Fe), scandium (Sc), yttrium (Y), and combinations thereof; and J is selected from the group of vanadium (V), chromium (Cr), manganese (Mn), cobalt (Co), nickel (Ni), copper (Cu), and combinations thereof.

The compounds listed above as cathode active materials may have a coating layer on a surface thereof. In another implementation, a mixture of a compound without having a coating layer and a compound having a coating layer, the compounds being selected from the compounds listed above, may be used. The coating layer may include at least one compound of a coating element selected from the group of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using a suitable method that does not adversely affect the physical properties of the cathode active material when a compound of the coating element is used. For example, the coating layer may be formed using a spray coating method, a dipping method, or the like.

The cathode active material layer may include a binder and a conducting agent.

The binder may strongly bind cathode active material particles together and to a current collector. Examples of the binder are polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used for providing conductivity to the cathode. A suitable electron conducting material that does not induce chemical change in batteries may be used. Examples of the conducting agent are natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used along or in a combination of at least two thereof.

Amounts of the cathode active material, the binder, and the conducting agent may be determined based on the type of lithium battery, e.g., a weight ratio of the cathode active material to a mixture of the conducting agent and the binder may be from about 98:2 to about 92:8. A mixing ratio of the conducting agent to the binder may be from about 1:1.0 to about 1:3, etc.

The anode 112 and the cathode 114 may be each manufactured by mixing an active material, a binder, and a conducting agent in a solvent to prepare an active material composition, and coating the active material composition on a current collector. The solvent may be N-methylpyrrolidone, etc. An amount of the solvent may be from about 1 part to about 10 parts by weight based on 100 parts by weight of the anode active material or cathode active material.

The separator 113 may be disposed between the cathode 114 and the anode 112. The separator 113 may include a porous coating layer disposed on a surface of a porous base, and a first adhesive layer including a plurality of dots disposed at intervals at a surface of the porous coating layer, wherein the plurality of dots of the first adhesive layer may penetrate through the porous coating layer to be on the surface of the porous base.

The plurality of dots of the first adhesive layer may include a dot having an average diameter of about 10 µm or greater. The plurality of dots of the first adhesive layer may penetrate through the porous coating layer to be on a surface of the porous base, and may help prevent separation of the porous coating layer and deformation during a cell assembling process. Accordingly, the separator 113 may have improved adhesion to an electrode. A lithium battery including the separator 113 may have improved lifetime characteristics. In some embodiments, the separator 113 may further include a second adhesive layer including a plurality of dots disposed at intervals at a surface of the porous base opposite to the porous coating layer.

The separator 113 may be the same as any of the separators according to the above-described embodiments, and thus details of the separator 113 are not repeated here. The lithium battery 100 including the separator 113 may maintain capacity for a variety of types thereof. Swelling of the cell may be suppressed when the separator 113 is impregnated with an electrolyte, so that deformation of the cell may not occur during the manufacture of the lithium battery 100.

According to another example embodiment, a method of manufacturing a lithium battery includes: disposing a separator according to an embodiment between a cathode and an anode to form at least one electrode assembly; stacking the at least one electrode assembly upon another one or rolling up the at least one electrode assembly, and heat-pressing a resulting stack or roll of the at least one electrode assembly at about 70° C. to about 120° C. to form an integrated electrode assembly; and injecting an electrolyte into the integrated electrode assembly. A cathode active material layer, the cathode, an anode active material layer, the anode, and the separator of the lithium battery may be the same as those described above.

The stack or roll of the at least one electrode assembly resulting from the stacking or rolling up may be heat-pressed at a temperature of about 70° C. to about 120° C., and in some embodiments, at a temperature of less or higher than about 100° C. When the heat-pressing is performed within these temperature ranges, the adhesion between the separator and the electrodes may be improved without deformation of a cell. After the injecting of the electrolyte into the integrated electrode assembly, the resulting integrated electrode assembly including the electrolyte may be encased in a case or pouch and then sealed, thereby completing the manufacture of the lithium battery.

In another implementation, a plurality of battery assemblies may be combined to form a battery pack, which may be used in a device that requires high capacity or high output, for example, in a laptop computer, a smart phone, electric vehicle, and the like.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparation Example 1: Preparation of Acrylic Acid Ester-Based Polymer Emulsion

After a flask reactor equipped with a condenser, a thermometer, a monomer emulsion solution inlet, a nitrogen gas inlet, and an agitator was flushed with nitrogen inside the flask reactor, 60 parts by weight of soft water and 1.5 parts by weight of sodium carbonate with dodecylbenzenesulfonic acid soda were added thereinto, and the temperature of the flask reactor was increased to about 70° C. Next, 10% of a monomer emulsion solution including 40 parts by weight of soft water, 0.5 parts by weight of sodium dodecylbenzenesulfonic acid, 30 parts by weight of 2-ethylhexylacrylate, 15 parts by weight of acrylonitrile, 50 parts by weight of isobornyl acrylate, 1 part by weight of methacrylic acid, 1.5 parts by weight of acrylic acid, 1.5 parts by weight of hydroxyethylacrylate, and 1 part by weight of ethylene dimethacrylate was added into the flask reactor, and then stirred for about 5 minutes, followed by adding 10 parts by weight of a 5% aqueous ammonium persulfate solution into the flask reactor to initiate reaction. After 1 hour, the rest of the monomer emulsion solution was dropwise added into the flask reactor over about 3 hours, together with 6 parts by weight of the 5% aqueous ammonium persulfate solution. After the dropwise addition of the monomer emulsion solution, the reaction was continued for further 2 hours to reach a polymerization conversion rate of about 98.2%. After cooling down to about 20° C., the remaining monomer was removed under a reduced pressure, followed by a pH adjustment to about 8 and a solid content adjustment to about 40 wt % to obtain an acrylic acid ester-based polymer aqueous emulsion (having an average diameter of about 120 nm and a weight average molecular weight of about 1,000,000).

Example 1: Manufacture of Separator

A polyethylene porous base having a thickness of about 12 μm (available from Asahi) was prepared. After α-$Al_2O_3$ powder having an average diameter of about 50 nm and an acrylic acid ester-based polymer emulsion were mixed in a ratio of 97:3, distilled water was added thereto to prepare a 10 wt % dispersion of the acrylic acid ester-based polymer (on a solid content basis). This dispersion was coated on a surface of the polyethylene porous base by using a micro gravure coater to form a coating layer having a thickness of about 4 μm. The coating layer was dried in a 50° C. oven by heating for about 4 hours to form a porous coating layer on the surface of the polyethylene porous base.

Next, a plurality of dots having an average diameter of 220 μm and a thickness of about 1 μm were formed at an interval of about 150 μm on the surface of the porous coating layer and an surface of the polyethylene porous base opposite to the porous coating layer by using a micro gravure method, and then left at room temperature for about 2 hours to form a first adhesive layer and a second adhesive layer, each with the plurality of dots, respectively, on the surface of the porous coating layer and the surface of the polyethylene porous base opposite to the porous coating layer.

The polyethylene porous base with the first adhesive layer and the second adhesive layer were dried at about 50° C. in a vacuum for about 4 hours so that the plurality of dots of the first adhesive layer penetrated through the porous coating layer, thereby forming a separator on the surface of the polyethylene porous base.

A solution used in the micro gravure method in forming the porous coating layer, the first adhesive layer, and the second adhesive layer was prepared by dispersing 10 wt % of styrene-butadiene copolymer (available from Zeon Co., weight average molecular weight: 1,000,000) (on a solid content basis) in distilled water. An area of each of the first adhesive layer and the second adhesive layer was about 27% of a total area of the separator, and a total area of the first adhesive layer and the second adhesive layer was about 54% of the total area of the separator.

Comparative Example 1: Manufacture of Separator

A polyethylene porous base having a thickness of about 12 μm (available from Asahi) was prepared. After α-$Al_2O_3$ powder having an average diameter of about 50 nm and an acrylic acid ester-based polymer emulsion were mixed in a ratio of 97:3, distilled water was added thereto to prepare a 10 wt % dispersion of the acrylic acid ester-based polymer (on a solid content basis). This dispersion was coated on a surface of the polyethylene porous base by using a micro gravure coater to form a coating layer having a thickness of about 4 μm. The coating layer was dried in a 50° C. oven by heating for about 4 hours to form a porous coating layer on the surface of the polyethylene porous base.

Next, a plurality of dots each having an average diameter of 220 μm and a thickness of about 1 μm were formed at an interval of about 150 μm on a surface of the porous coating layer and a surface of the polyethylene porous base opposite to the porous coating layer by using a micro gravure method, and then dried at about 60° C. for about 1 hour to form a first adhesive layer and a second adhesive layer, each with the plurality of dots, respectively, on the surface of the porous coating layer and the surface of the polyethylene porous base opposite to the porous coating layer.

A solution used in the micro gravure method in forming the porous coating layer, the first adhesive layer, and the second adhesive layer was prepared by dispersing 10 wt % of styrene-butadiene copolymer (available from Zeon Co., weight average molecular weight: 1,000,000) (on a solid content basis) in distilled water. An area of each of the first adhesive layer and the second adhesive layer was about 27% of a total area of the separator, and a total area of the first adhesive layer and the second adhesive layer was about 54% of the total area of the separator.

Example 2: Manufacture of Lithium Battery 2-1. Manufacture of Cathode 97.2 parts by weight of $LiCoO_2$ powder, 1.5 parts by weight of a polyvinylidene fluoride (PVDF) binder, and 1.3 parts by weight of carbon black as a conducting agent were dispersed in an N-methylpyrrolidone solvent to prepare a slurry. The slurry was coated on a aluminum (Al) current collector to a thickness of about 145 μm with a doctor blade (a gap of about 170 mm), and then thermally treated at about 100° C. in a vacuum for about 5.5 hours, followed by roll-pressing to manufacture a cathode plate having a cathode active material layer. The cathode plate was cut to a stripe of about 457 mm×65.5 mm, thereby manufacturing a cathode.

2-2. Manufacture of Anode 98 parts by weight of graphite, 1 part by weight of styrene-butadiene rubber as a binder, and 1 part by weight of carboxymethylcellulose as a thickening agent were dispersed in N-methyl pyrrolidone solvent, and then mixed with an agate mortar to prepare a slurry. The slurry was coated on an aluminum (Al) current collector to a thickness of about 140 μm with a doctor blade (a gap of about 160 mm), and then thermally treated at about 145° C. in a vacuum oven for about 6.5 hours, followed by roll-pressing to manufacture an anode plate having an anode active material layer. The anode plate was cut to a stripe of about 448 mm×70.0 mm, thereby manufacturing a cathode.

2-3. Preparation of Separator

The separator manufactured in Example 1 was prepared.

2-4. Manufacture of Lithium Battery

A plurality of electrode assemblies were manufactured using cathodes as manufactured in Section 2-1, anodes as manufactured in Section 2-2, and separators as manufactured in Example 1, wherein one cathode and one anode with one separator therebetween are assembled into one electrode assembly. The electrode assemblies were stacked upon one another and then pressed using a heat press at about 110° C. and a pressure of about 250 kgf for about 50 seconds to obtain an integrated electrode assembly.

After the integrated electrode assembly was encased in a case, an electrolyte of 1.3 M $LiPF_6$ dissolved in a mixed solvent of ethylene carbonate (EC), dimethylene carbonate (MDC) and diethylene carbonate (DEC) in a volume ratio of 3:5:2 was injected into the case, and then vacuum-sealed, thereby manufacturing a lithium battery. The separator was disposed such that the first adhesive layer thereon faced the anode.

Comparative Example 2: Manufacture of Lithium Battery

A lithium battery was manufactured in substantially the same manner as in Example 2, except that the separator of Comparative Example 1 was used instead of the separator of Example 1.

Evaluation Example 1: Scanning Electron Microscopic (SEM) Evaluation

A scanning electron microscopic (SEM) test was performed on surfaces and cross-sections of the separators of Example 1 and Comparative Example 1. The results are shown in FIGS. 3A, 3B, and 4.

Figure 3A:
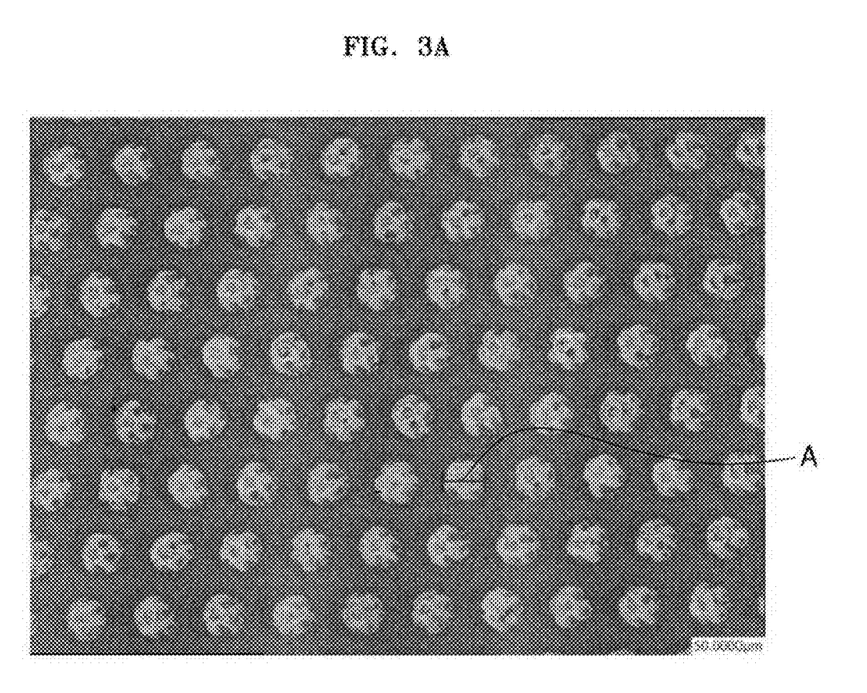
FIGS. 3A and 3B illustrate scanning electron microscopic (SEM) images of a surface and a cross-section of a separator of Example 1 for a lithium battery, respectively.

Referring to FIG. 3A, the surface of the separator of Example 1 was found to have the first adhesive layer including a plurality of dots disposed regularly at an interval of about 200 μm and having an average diameter of about 222.7 μm (denoted by "A").

Figure 3B:
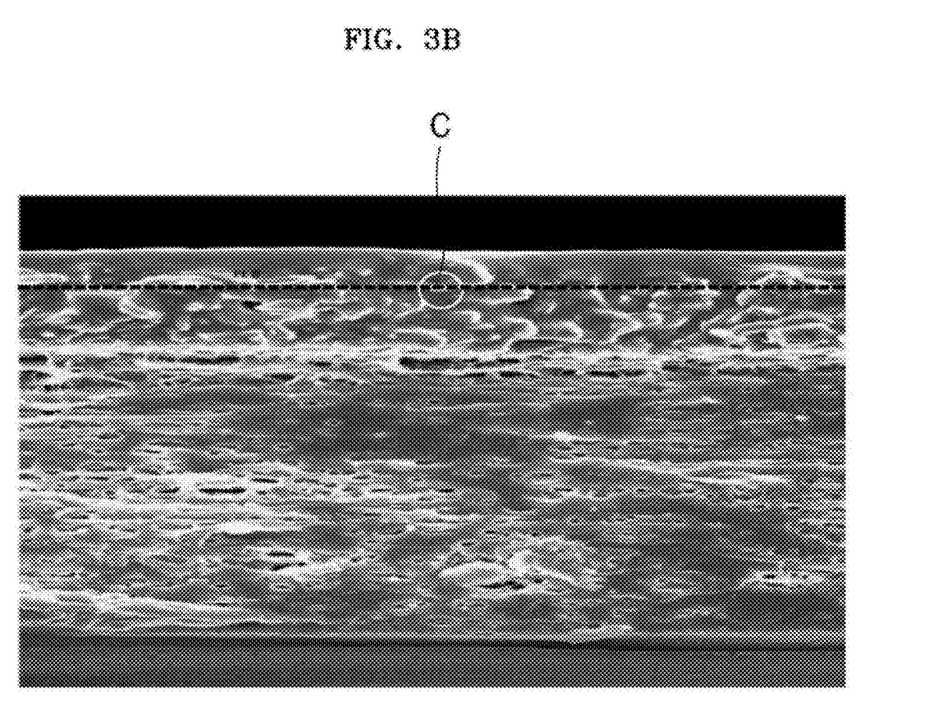

Referring to FIG. 3B, the separator of Example 1 was found to have dots of the first adhesive layer that penetrated through the porous coating layer to be on the surface of the polyethylene porous base (denoted by "C").

Figure 4:
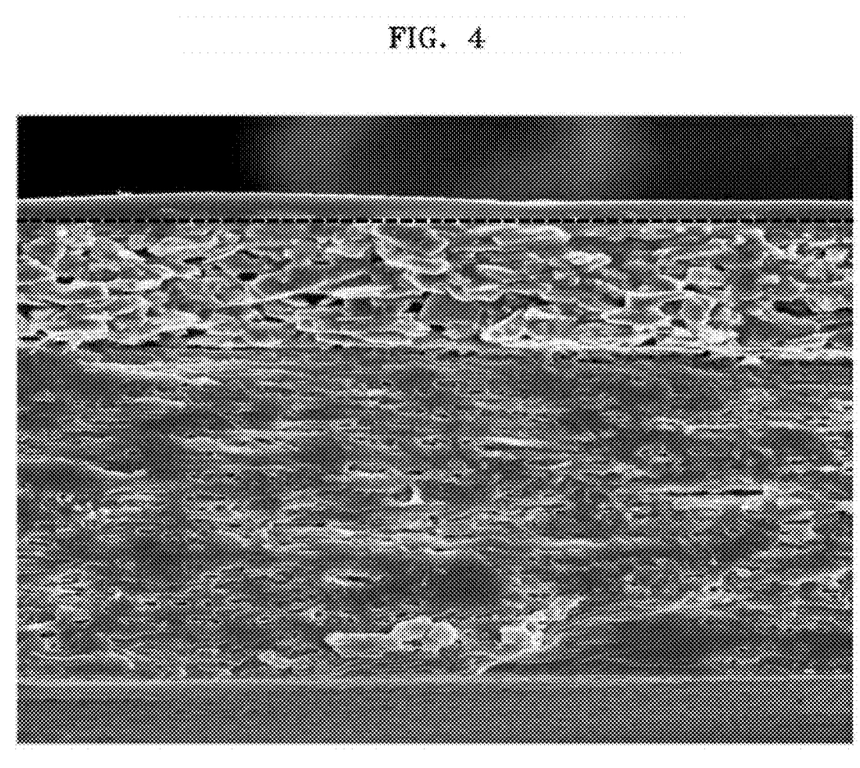
FIG. 4 illustrates a SEM image of a cross-section of a separator of Comparative Example 1 for a lithium battery.

Referring to FIG. 4, the separator of Comparative Example 1 was found to have dots of the first adhesive layer only on a surface of the separator.

Evaluation Example 2: Evaluation of Adhesion Between Separator and Electrode

Each of the separators of Example 1 and Comparative Example 1 was stacked on a cathode plate, wrapped with a PET release film, and then bound together by heat pressing at about 120° C. for about 50 seconds. The separator bound to the cathode plate was cut to a size of 20 mm (width) and 70 mm (length) for a 180-degree peel test using an tensile strength tester (available from Instron). The force (gf/mm) to separate each of the separators of Example 1 and Comparative Example 1 from the cathode plate was measured as adhesion between the porous coating layer of the separator and the cathode plate, i.e., adhesion between the separator and the cathode plate. The results are shown in Table 1 and FIG. 5.

TABLE 1

| Example | Adhesion between porous coating layer and cathode plate (gf/mm) |
|---|---|
| Example 1 | 0.348 |
| Comparative Example 1 | 0.134 |

Figure 5:
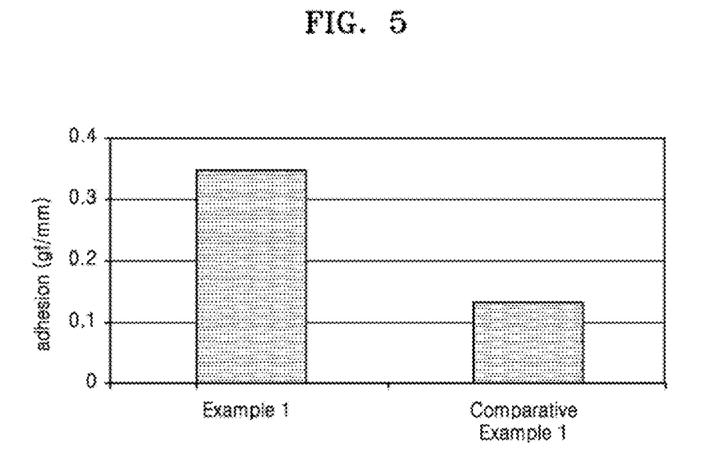
FIG. 5 illustrates a graph of adhesions (gf/mm) between each of the separators of Example 1 and Comparative Example 1 to a cathode.

Referring to Table 1 and FIG. 5, the adhesion between the porous coating layer of the separator of Example 1 and the cathode plate was about 0.348 gf/mm, while the adhesion between the porous coating layer of the separator of Comparative Example 1 and the cathode plate was about 0.134 gf/mm.

These results indicate that the adhesion between the porous coating layer of the separator of Example 1 and the cathode plate was improved, compared to the adhesion between the porous coating layer of the separator of Comparative Example 1 and the cathode plate.

Evaluation Example 3: Evaluation of Lifetime Characteristics

The lithium batteries of Example 2 and Comparative Example 2 manufactured using the separators of Example 1 and Comparative Example 1, respectively, were each charged with a constant current of 0.2 C rate at about 25° C. to a voltage of about 4.2 V, and then with a constant voltage of about 4.2 V to a current of about 0.01 C, followed by discharging with a constant current of about 0.2 C to a voltage of about 3.05 V (Formation Process).

Figure 6:
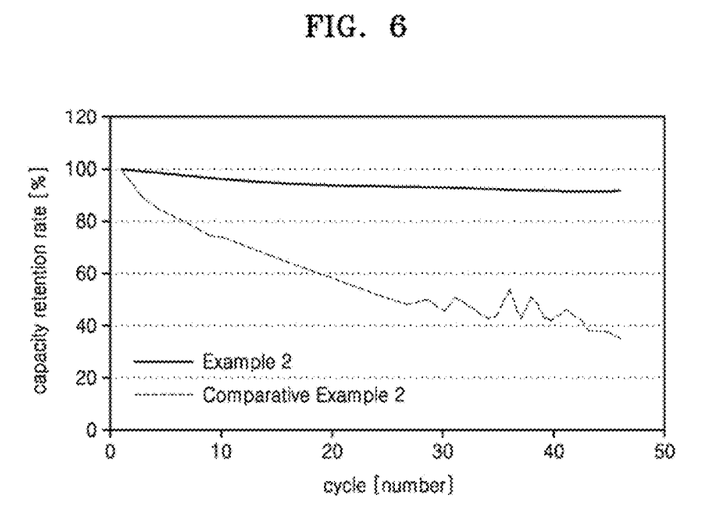
FIG. 6 illustrates a graph of lifetime characteristics of lithium batteries of Example 2 and Comparative Example 2.

Subsequently, after the formation process, each of the lithium batteries was charged with a constant current of 0.5 C rate at about 25° C. to a voltage of about 4.2 V, and then with a constant voltage of about 4.2 V to a current of about 0.01 C, followed by discharging with a constant current of about 0.5 C to a voltage of about 3.0 V. This cycle of charging and discharging was repeated 40 times. The charge/discharge test results are shown in Table 2 and FIG. 6. The capacity retention rate was calculated using Equation 1 below.

$$\text{Capacity retention rate[\%]} = [\text{Discharge capacity at } 40^{th} \text{ cycle/Discharge capacity at } 1^{st} \text{ cycle}] \times 100 \quad \text{<Equation 1>}$$

TABLE 2

| Example | Capacity retention rate (%) |
|---|---|
| Example 2 | 92 |
| Comparative Example 2 | 45 |

Referring to Table 2 and FIG. 6, the lithium battery of Example 2 was found to have an improved capacity retention rate, compared to the lithium battery of Comparative Example 2. These results indicate that the lithium battery of Example 2 had improved lifetime characteristics, compared to the lithium battery of Comparative Example 2.

By way of summation and review, a lithium battery, for example, a lithium secondary battery, may include a separator between a cathode and an anode. The separator may serve as a path for lithium ions in the lithium battery, and may prevent direct contact between the cathode and the anode to prevent a short circuit. A polyolefin-based porous base may be used as the separator, but the polyolefin-based porous base may undergo significant thermal shrinkage at a temperature of about 100° C. or greater because of its inherent material characteristics and a preparation process thereof including such as stretching, and thus may cause a short circuit between the cathode and the anode.

It has been considered to provide a separator having a porous coating layer on at least one surface of a porous base including a plurality of pores. The porous coating layer may be formed by coating a mixture of inorganic particles and a binder polymer on the at least one surface of the porous base. Such a porous coating layer including inorganic particles may reduce adhesion between an electrode and the separator and, thus, the separator may not be stably bound to an electrode, but rather may be separated therefrom, during an assembly process of a cell, and thus may cause deformation of the cell and consequently hinder effective delivery of lithium ions. The inorganic particles in the porous coating layer may also be separated therefrom, thus lowering lifetime characteristics of a lithium battery including the separator.

A separator for a lithium battery with improved adhesion to an electrode, a lithium battery with improved lifetime characteristics including the separator, and a method of manufacturing the lithium battery are desired.

As described above, embodiments may provide a separator for a lithium battery that includes a first adhesive layer including a plurality of dots disposed at an interval on a surface of a porous coating layer on a surface of a porous base. The dots of the first adhesive layer may penetrate through the porous coating layer to be on the surface of the porous base. The separator may help prevent separation of the porous coating layer from the porous base and improve adhesion to an electrode. A lithium battery including the separator may have improved lifetime characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a lithium battery, comprising:
   a porous coating layer disposed on a surface of a porous base; and
   a first adhesive layer including a plurality of dots disposed at intervals at a surface of the porous coating layer, the plurality of dots of the first adhesive layer penetrating through the porous coating layer to be on the surface of the porous base, wherein the plurality of dots of the first adhesive layer that penetrate through the porous coating layer are formed using a vacuum drying operation.

2. The separator as claimed in claim 1, wherein the plurality of dots of the first adhesive layer have an average diameter of about 10 μm or greater.

3. The separator as claimed in claim 1, wherein the plurality of dots of the first adhesive layer have an average diameter of about 100 μm to about 500 μm.

4. The separator as claimed in claim 1, wherein the intervals of the plurality of dots of the first adhesive layer are regular.

5. The separator as claimed in claim 1, wherein the intervals of the plurality of dots of the first adhesive layer are regular in a range of about 0.1 mm to about 10 mm.

6. The separator as claimed in claim 1, wherein the first adhesive layer includes a dot having a thickness of about 0.5 um to about 2 um.

7. The separator as claimed in claim 1, wherein the first adhesive layer includes dots of a polymer structure of one or more of polyethylene, polypropylene, an ethylene propylene copolymer, polyvinylchloride, polyvinylidene chloride, polyvinylidene fluoride, polystyrene, polyacrylonitrile, polytetrafluoroethylene (PTFE), polymethacrylate, polymethylmethacrylate, polyvinylacetate, polyisoprene, polychloroprene, polyester, polycarbonate, polyamide, polyacrylate, polyurethane, polyethylene oxide, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylated styrene-butadiene copolymer, an acrylonitrile-butadiene copolymer, an acrylonitrile-butadiene-styrene copolymer, acryl rubber, butyl rubber, fluorine rubber, phenol resin, epoxy resin, polyvinylpyrolidone, polyepichlorohydrin, polyphosphagen, ethylene propylene diene copolymer, polyvinylpyridine, sulfonated chloropolyethylene, polysulfone, polyvinylalcohol, polyvinylacetate, thermoplastic polyester rubber (PTEE), carboxymethylcellulose, hydroxypropylmethylcellulose, hydroxypropylcellulose, or diacetylcellulose.

8. The separator as claimed in claim 1, wherein the first adhesive layer is disposed opposite to an anode.

9. The separator as claimed in claim 1, further comprising a second adhesive layer including a plurality of dots disposed at intervals at a surface of the porous base opposite to the porous coating layer.

10. The separator as claimed in claim 1, wherein the porous coating layer includes inorganic particles and polymer particles.

11. The separator as claimed in claim 10, wherein the inorganic particles include one or more of α-alumina (α-$Al_2O_3$), γ-alumina (γ-$Al_2O_3$), boehmite (γ-AlO(OH)), gibbsite (γ-Al(OH)$_3$), colloidal silica, zirconium oxide, magnesium fluoride, $BaTiO_3$, Pb(Zr,Ti)$O_3$(PZT), $Pb_{1-x}LaZr_{1-y}Ti_yO_3$ (PLZT), PB(Mg$_{3}$Nb$_{2/3}$)$O_3$—$PbTiO_3$ (PMN-PT), $HfO_2$, $SrTiO_3$, $TiO_2$, SiC, $SnO_2$, or $CeO_2$.

12. The separator as claimed in claim 10, wherein the polymer particles include one or more of acrylic acid ester-based polymer particles or styrene-butadiene rubber particles.

13. The separator as claimed in claim 10, wherein the polymer particles are included in the porous coating layer in an amount of about 0.1 part to about 10 parts by weight, based on 100 parts by weight of the inorganic particles.

14. A lithium battery, comprising:
   a cathode;
   an anode; and
   the separator as claimed in claim 1 disposed between the cathode and the anode.

15. A method of manufacturing a lithium battery, the method comprising:
   disposing the separator as claimed in claim 1 between a cathode and an anode to form at least one electrode assembly;
   stacking the at least one electrode assembly upon one another or rolling up the at least one electrode assembly, and heat-pressing a resulting stack or roll of the at least one electrode assembly at about 70° C. to about 120° C. to form an integrated electrode assembly; and
   injecting an electrolyte into the integrated electrode assembly.

* * * * *